(12) United States Patent
Daido (10) Patent No.: US 11,495,206 B2
(45) Date of Patent: Nov. 8, 2022

(54) VOICE SYNTHESIS METHOD, VOICE SYNTHESIS APPARATUS, AND RECORDING MEDIUM

(71) Applicant: YAMAHA CORPORATION, Hamamatsu (JP)

(72) Inventor: Ryunosuke Daido, Hamamatsu (JP)

(73) Assignee: YAMAHA CORPORATION, Hamamatsu (JP)

(*) Notice: Subject to any disclaimer, the term of this patent is extended or adjusted under 35 U.S.C. 154(b) by 143 days.

(21) Appl. No.: 16/886,063

(22) Filed: May 28, 2020

(65) Prior Publication Data

US 2020/0294484 A1    Sep. 17, 2020

Related U.S. Application Data

(63) Continuation of application No. PCT/JP2018/043655, filed on Nov. 28, 2018.

(30) Foreign Application Priority Data

Nov. 29, 2017    (JP) .............................. JP2017-229042

(51) Int. Cl.
*G10L 13/02* (2013.01)
*G10L 13/07* (2013.01)
(Continued)

(52) U.S. Cl.
CPC .............. *G10L 13/033* (2013.01); *G06N 3/08* (2013.01); *G10H 1/0066* (2013.01); *G10L 13/06* (2013.01); *G10H 2250/455* (2013.01)

(58) Field of Classification Search
CPC .......... G10L 13/02; G10L 13/07; G10L 13/10
See application file for complete search history.

(56) References Cited

U.S. PATENT DOCUMENTS 4,661,915 A * 4/1987 Ott .......................... G10L 19/00
704/235
9,355,634 B2  5/2016 Iriyama
(Continued)

FOREIGN PATENT DOCUMENTS

EP  2276019 A1  1/2011
EP  3719796 A1  10/2020
(Continued)

OTHER PUBLICATIONS

Office Action issued in Japanese Appln. No. 2020-113896 dated Oct. 5, 2021. English machine translation provided.
(Continued)

*Primary Examiner* — Shreyans A Patel
(74) *Attorney, Agent, or Firm* — Rossi, Kimms & McDowell LLP (57) ABSTRACT

Voice synthesis method and apparatus generate second control data using an intermediate trained model with first input data including first control data designating phonetic identifiers, change the second control data in accordance with a first user instruction provided by a user, generate synthesis data representing frequency characteristics of a voice to be synthesized using a final trained model with final input data including the first control data and the changed second control data, and generate a voice signal based on the generated synthesis data.

8 Claims, 6 Drawing Sheets

(51) Int. Cl.
*G10L 13/10* (2013.01)
*G10L 13/033* (2013.01)
*G06N 3/08* (2006.01)
*G10H 1/00* (2006.01)
*G10L 13/06* (2013.01)

(56) References Cited

U.S. PATENT DOCUMENTS

| | | | |
|---|---|---|---|
| 9,978,359 B1* | 5/2018 | Kaszczuk | G10L 13/02 |
| 2010/0066742 A1* | 3/2010 | Qian | G10L 13/10 |
| | | | 345/440.1 |
| 2014/0236597 A1* | 8/2014 | Ben Ezra | G10L 13/06 |
| | | | 704/235 |
| 2016/0133246 A1 | 5/2016 | Ogasawara | |
| 2016/0240215 A1* | 8/2016 | Suess | G10L 13/04 |
| 2018/0211649 A1* | 7/2018 | Li | G10L 13/047 |

FOREIGN PATENT DOCUMENTS

| | | | |
|---|---|---|---|
| JP | 2001134283 A | | 5/2001 |
| JP | 2004246129 A | * | 9/2004 |
| JP | 2004246129 A | | 9/2004 |
| JP | 2008268477 A | | 11/2008 |
| JP | 2008292587 A | | 12/2008 |
| JP | 2013137520 A | | 7/2013 |
| JP | 2014178512 A | | 9/2014 |
| JP | 2016090916 A | | 5/2016 |
| JP | 2017097176 A | | 6/2017 |
| JP | 2019101094 A | | 6/2019 |

OTHER PUBLICATIONS

International Search Report issued in Intl. Appln. No PCT/JP2018/043655 dated Feb. 26, 2019 English translation provided.
Written Opinion issued in Intl. Appln. No. PCT/JP2018/043655 dated Feb. 26, 2019.
Zen. "Statistical Parametric Speech Synthesis." Preprint submitted to Speech Communication. Apr. 6, 2009: 1-23.
Nishimura. "Singing voice synthesis based on deep neural networks." Interspeech 2016. Sep. 8-12, 2016: 2478-2482.
Blaauw. "A Neural Parametric Singing Synthesizer." Interspeech 2017. arXiv:1704.03809v3 [cs.SD] Aug. 17, 2017: 1-9.
Office Action issued in Japanese Appln. No. 2020-113896 dated Apr. 26, 2022. English machine translation provided.
Extended European Search Report issued in European Appln. No. 18882396.7 dated Jul. 26, 2021.
Loscus "Spectral Processing of the Singing Voice", A Dissertation Submitted to the Department of Information and Communication Technologies From the Pompeu Fabra University in Partial Fulfillment of the Requirements for the Degree of Doctor Per La Universitat Pompeu Fabra. 2007. pp. 1-183. XP055824388, Retrieved from the Internet:URL:https://www.tdx.cat/bitstream/handle/10803/7542/talm.pdf [retrieved on Jul. 14, 2021].

* cited by examiner

VOICE SYNTHESIS METHOD, VOICE SYNTHESIS APPARATUS, AND RECORDING MEDIUM

CROSS REFERENCE TO RELATED APPLICATIONS

This application is a Continuation Application of PCT Application No. PCT/JP2018/043655, filed Nov. 28, 2018, and is based on and claims priority from Japanese Patent Application No. 2017-229042, filed Nov. 29, 2017, the entire contents of each of which are incorporated herein by reference.

BACKGROUND

Technical Field

The present disclosure relates to a technique for synthesizing a voice.

Description of Related Art

There are known in the art a variety of techniques for vocal synthesis based on phonemes. For example, Japanese Patent Application Laid-Open Publication No. 2016-90916 (hereafter, "Patent Document 1") discloses a technique for synthesizing a singing voice, which is obtained by vocalizing a sequence of musical notes designated by a user on an editing screen. The editing screen is a piano roll screen on which a time axis and a pitch axis are provided. The user designates each phoneme to be vocalized, a pitch, and a sound period for each note that together constitute a song.

In the technique disclosed in Patent Document 1, a user may designate a phonetic identifier, a pitch, and a sound period for each note, but it is difficult to accurately reflect an intension or taste of the user in a voice to be synthesized.

Moreover, the following NPL Documents 1-3 disclose how trained models are used:

NPL Document 1: Statistical Parametric Speech Synthesis, Heiga Zen, Keiichi Tokuda, and Alan W. Black, 6 Apr. 2009, Nagoya Institute of Technology, Preprint submitted to Speech Communication;

NPL Document 2: Singing voice synthesis based on deep neural networks, Masanari Nishimura, Kei Hashimoto, Keiichiro Oura, Yoshihiko Nankaku, and Keiichi Tokuda, Sep. 12, 2016, Nagoya Institute of Technology, INTERSPEECH 2016, San Francisco, USA;

NPL Document 3: A Neural Parametric Singing Synthesizer, Merlijn Blaauw, Jordi Bonada, 20-24 Aug. 2017, INTERSPEECH 2017, Stockholm, Sweden NPL Document 1's FIG. 19 discloses a text analysis module including three decision trees: a text analysis module, a duration module, and an F0 module. All models or modules disclosed in NPL Document 1 are hidden Markov model (HMM)-based. The text analysis module generates labels from input text. The spectrum modules generates a spectrum from the labels. The duration module generates a duration of each spectrum from the labels, and the F0 module generates a sequence of pitches from the labels. NPL Document 1 discloses a fundamental configuration for synthesizing audio using a maximum likelihood (ML) model.

NPL Document 2 discloses deep neural networks (DNNs) to replace HMMs disclosed in NPL Document 1. In the technique disclosed in NPL Document 2, a music score is first converted into a sequence of input features that represent a phoneme, the duration of the phoneme, etc., and generative models, such as HMMs or DNNs, to generate a sequence of pitches according to the input features.

NPL Document 3 discloses applying the HMM-based system in NPL Document 1 and the DNN-based system in NPL Document 2 to singing voice synthesis. It also discloses Recurrent Neural Networks (RNNs)-based architectures. The disclosed system generates acoustic features (a harmonic spectral envelope, an aperiodicity envelope and a voiced/unvoiced decision) with an autoregressive generative model with control inputs of linguistic features (phoneme identity, a position within a phoneme, pitch and phonetic timings). See FIG. 1.

SUMMARY

In view of the above circumstances, it is an object of preferred aspects of the present disclosure to generate a synthesized voice that suits an intension or taste of a user.

In one aspect, a voice synthesis method includes: generating second control data using an intermediate trained model with first input data including first control data designating phonetic identifiers; changing the second control data in accordance with a first user instruction provided by a user; generating synthesis data representing frequency characteristics of a voice to be synthesized using a final trained model with final input data including the first control data and the changed second control data; and generating a voice signal based on the generated synthesis data.

In another aspect, a voice synthesis apparatus includes: a memory storing machine instructions; at least one processor that implements the machine instructions to execute a plurality of tasks, including: a first generating task that generates second control data using an intermediate trained model with first input data including first control data designating phonetic identifiers; a first changing task that changes the second control data in accordance with a first user instruction provided by a user; a second generating task that generates synthesis data representing frequency characteristics of a voice to be synthesized using a final trained model with final input data including the first control data and the changed second control data; and a third generating task that generates a voice signal based on the generated synthesis data.

In still another aspect, a non-transitory computer-readable recording medium stores a program executable by a computer to perform a voice synthesis method comprising: generating second control data using an intermediate trained model with first input data including first control data designating phonetic identifiers; changing the second control data in accordance with a first user instruction provided by a user; generating synthesis data representing frequency characteristics of a voice to be synthesized using a final trained model with final input data including the first control data and the changed second control data; and generating a voice signal based on the generated synthesis data.

DESCRIPTION OF THE EMBODIMENTS

First Embodiment

Figure 1:
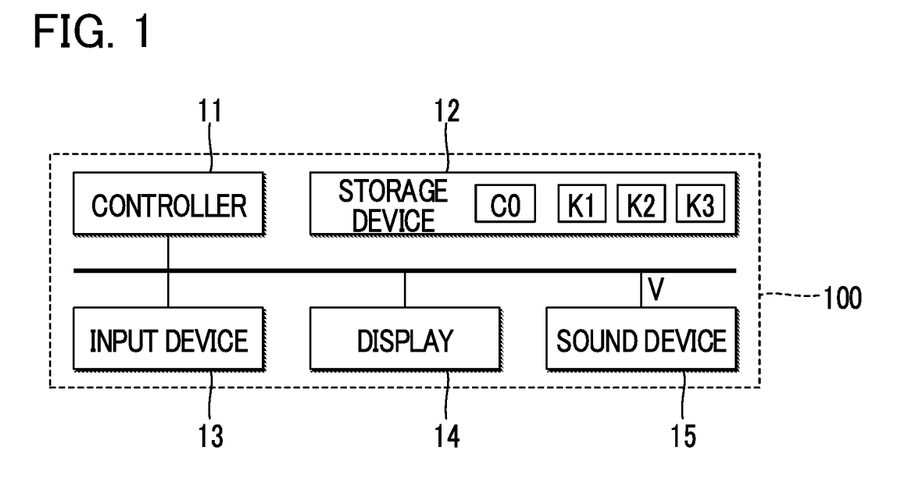
FIG. 1 is a block diagram illustrating a configuration of a voice synthesis apparatus according to a first embodiment of the present disclosure.

FIG. 1 is a block diagram illustrating a configuration of a voice synthesis apparatus 100 according to a first embodiment of the present disclosure. The voice synthesis apparatus 100 synthesizes a voice (hereafter, "voice to be synthesized") corresponding to phonemes. The voice synthesis apparatus 100 in the first embodiment is a singing synthesis apparatus that synthesizes a voice, where the synthesized voice is a singing voice virtually sung by a singer. As illustrated in FIG. 1, the voice synthesis apparatus 100 in the first embodiment is realized by a computer system including a controller 11, a storage device 12, an input device 13, a display 14, and a sound device 15. For example, a portable information terminal such as a mobile phone or a smartphone, or a portable or stationary information terminal such as a personal computer is preferably used as the voice synthesis apparatus 100.

The display 14 is constituted of, for example, a liquid crystal display panel and displays an image designated by the controller 11. The input device 13 is an input device that receives instructions provided by a user. Specifically, operators that are operable by the user or a touch panel that detects contact on a display surface of the display 14 is preferably used as the input device 13.

The controller 11 is, for example, processing circuitry such as a CPU (Central Processing Unit) and controls overall the components constituting the voice synthesis apparatus 100. The controller 11 in the first embodiment generates a voice signal V in a time domain representative of a waveform of a synthesized voice. The sound device 15 (for example, a loudspeaker or a headphone) reproduces a voice that is represented by the voice signal V generated by the controller 11. A digital-to-analog converter converts the voice signal V generated by the controller 11 from a digital signal to an analog signal, and an amplifier amplifies the voice signal V. For convenience, illustration of the digital-to-analog converter and the amplifier are omitted. Although the sound device 15 is mounted on the voice synthesis apparatus 100 in the configuration shown in FIG. 1, the sound device 15 separate from the voice synthesis apparatus 100 may be connected either wired or wirelessly to the voice synthesis apparatus 100.

The storage device 12 is constituted of, for example, a known recording medium such as a magnetic recording medium or a semiconductor recording medium, or a combination of types of recording media, and has stored therein a program to be executed by the controller 11 and various types of data used by the controller 11. The storage device 12 (for example, a cloud storage) may be provided separately from the voice synthesis apparatus 100 to enable the controller 11 to write to and read from the storage device 12 via a communication network, such as a mobile communication network or the Internet. That is, the storage device 12 may be omitted from the voice synthesis apparatus 100.

The storage device 12 has stored therein control data C0 representative of musical characteristics of a song. The control data C0 in the first embodiment is song data designating a pitch, a phonetic identifier, and a sound period for each of notes constituting the song. That is, the control data C0 controls a musical level (that is, musical elements). The control data C0 can be, in other words, data representative of a score. The pitches are represented by means of MIDI (Musical Instrument Digital Interface) note numbers. The phonetic identifiers are by means of letters (or, lyrics of the song) to be vocalized as the synthesized voice. Specifically, the phonetic identifiers are represented by MIDI text events. For example, a single syllable is designated by a phonetic identifier for each note. The sound period is a duration for which one note in the song is vocalized; and can be specified as, for example, a start point of the note to an end point of the note, or the start point of the note, and the duration of the period. The sound period may be specified by, for example, MIDI duration data. The control data C0 in the first embodiment can designate musical symbols representative of musical expressions in the song. For example, symbols denoting musical expression such as forte (f), piano (p), crescendo, decrescendo, staccato, tenuto, or slur are designated by the control data C0.

Figure 2:
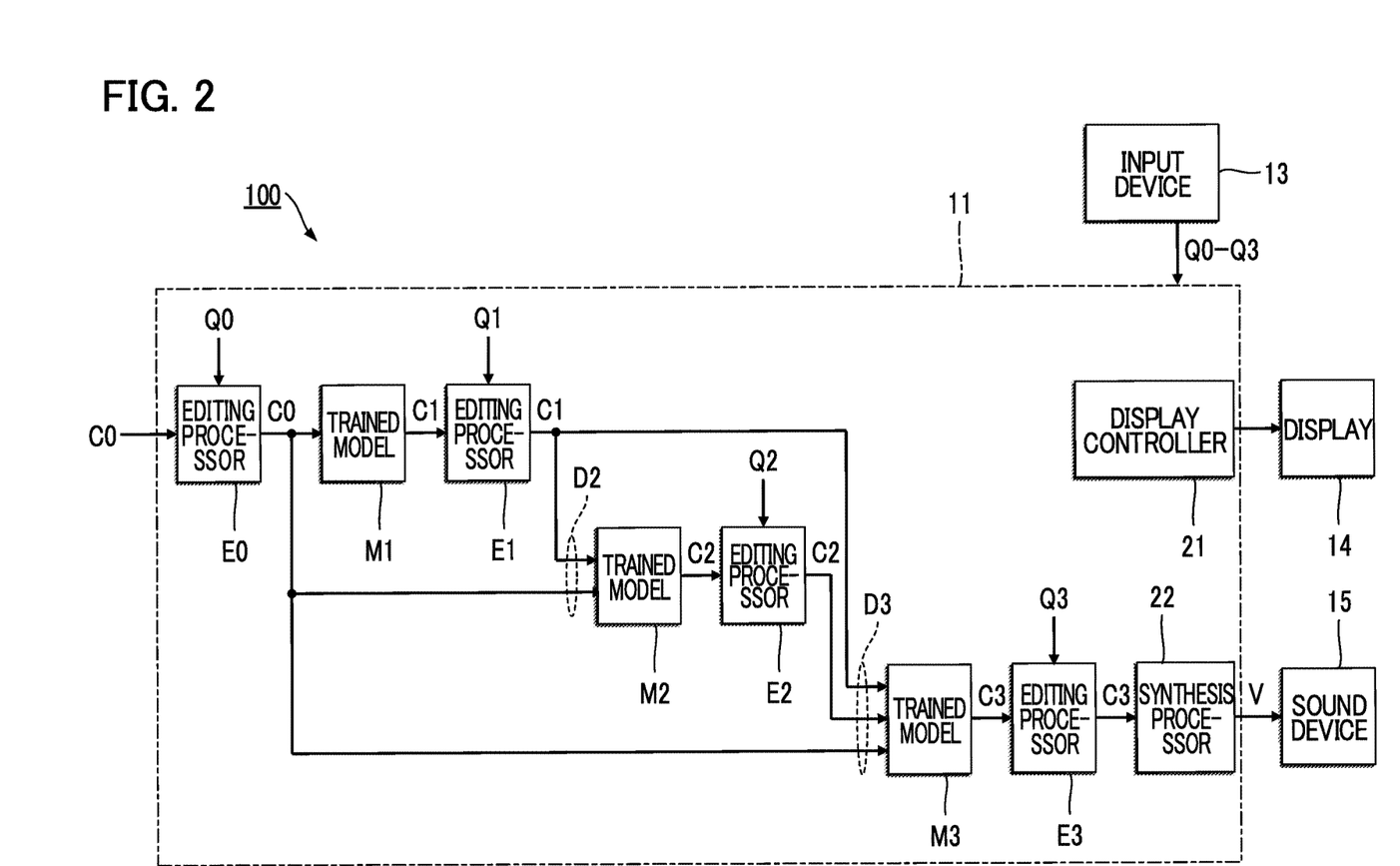
FIG. 2 is a block diagram illustrating a functional configuration of the voice synthesis apparatus.

FIG. 2 is a block diagram illustrating a functional configuration of the controller 11. As illustrated in FIG. 2, the controller 11 realizes functions (a display controller 21, an editing processor E0, a trained model M1 (an example of an intermediate trained model), an editing processor E1, a trained model M2 (an example of a second trained model), an editing processor E2, a trained model M3 (an example of a final trained model), an editing processor E3, and a synthesis processor 22) for generating the voice signal V corresponding to the control data C0 by executing of the computer program stored in the storage device 12. The functions of the controller 11 may be realized by a set of apparatuses (that is, by a system). Alternatively, some or all of the functions of the controller 11 may be realized by dedicated electronic circuitry (for example, by signal processing circuitry).

Figure 3:
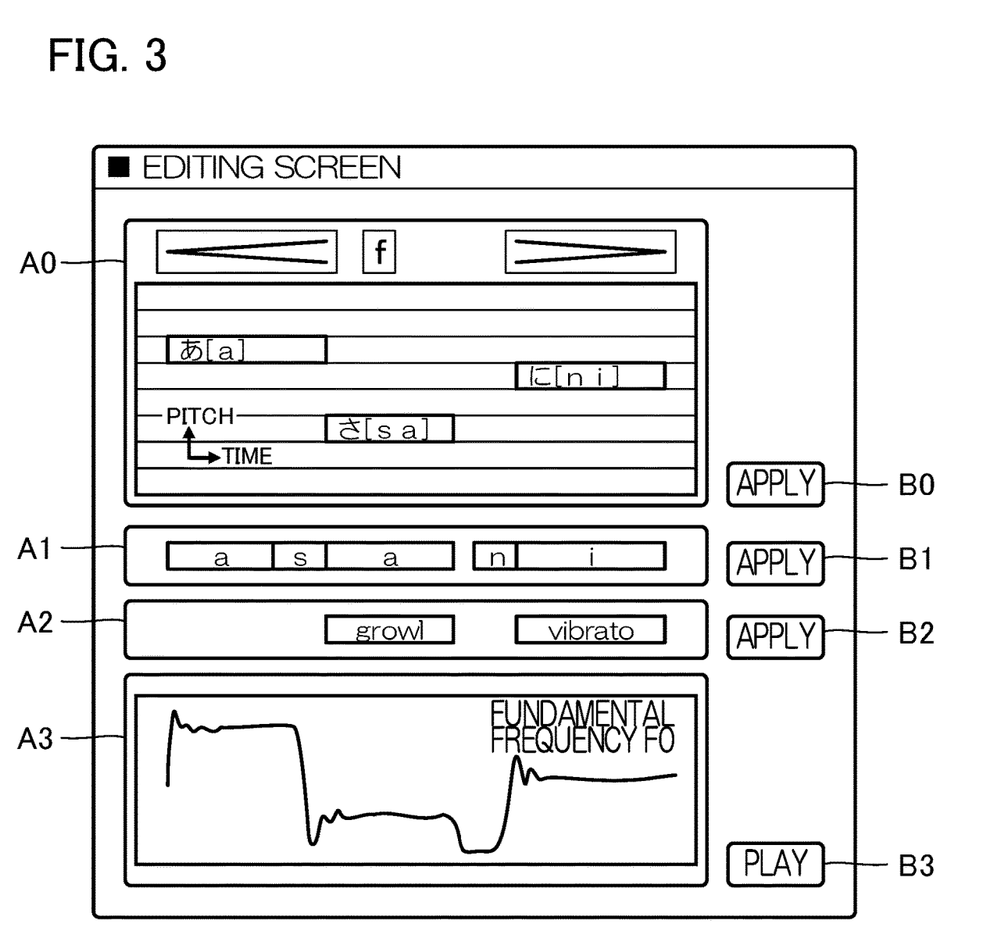
FIG. 3 is a schematic diagram of an editing screen.

The display controller 21 causes the display 14 to display images. The display controller 21 in the first embodiment causes the display 14 to display an editing screen, by reference to which a user carries out instructions for adjusting a voice to be synthesized. FIG. 3 is a schematic diagram of the editing screen. As illustrated in FIG. 3, the editing screen includes editing areas A (A0 to A3) and buttons B (B0 to B3). Each of the buttons B is indicative of a control element that receives an instruction from the user. A common time axis (a horizontal axis) is applied to the editing areas A (A0 to A3).

The editing area A0 comprises a so-called piano roll screen for display of music content corresponding to the control data C0. Specifically, note images (note bars), each of which is representative of a note designated by the control data C0, are chronologically arranged in a coordinate space having a time axis and a pitch axis in the editing area A0. The position and length of each of the note images on the time axis is controlled in accordance with the sound period designated by the control data C0, and the position of each of the note images on the pitch axis is controlled in accordance with the pitch designated by the control data C0. A phonetic identifier (specifically, a grapheme) designated by the control data C0 is displayed within each of the note images. Musical symbols designated by the control data C0 are also displayed in the editing area A0. In FIG. 3, symbols representative of musical expression, namely, crescendo, forte, and decrescendo are provided as examples. The user can provide an editing instruction Q0 for the editing area A0 by operating the input device 13. The editing instruction Q0 may be, for example, an instruction to change a condition (a sound period, pitch, or a phonetic identifier) of a note, or an instruction to change (add or delete) a musical symbol.

The editing area A1 is an image area for representing at a phonetic level characteristics (that is, characteristics of phonemes), for example, a series of phonemes (vowels or consonants) that are present in a voice to be synthesized. Specifically, the phonemic symbol and the sound period of each phoneme for vocalization of the voice to be synthesized are displayed in the editing area A1. The user can provide an editing instruction Q1 for the editing area A1 by operating the input device 13. The editing instruction Q1 may be, for example, an instruction to change a phonemic symbol for each phoneme or an instruction to change (for example, move or extend/reduce) a sound period.

The editing area A2 is an image area for representing at a voicing level characteristics of musical expression that relate to voicing, namely, types of musical expression to be imparted to the voice to be synthesized. Specifically, expression periods and a type of expression (hereafter, "expression type") in each of the expression periods are displayed in the editing area A2. An "expression period" is a period during which musical expressions are imparted to the voice to be synthesized. A voice quality such as hoarseness or breathiness, and a vocal technique such as vibrato or fall are examples of musical expressions to be imparted to the voice to be synthesized. The user can provide an editing instruction Q2 for the editing area A2 by operating the input device 13. The editing instruction Q2 is, for example, an instruction to change (for example, move or extend/reduce) each expression period or an instruction to change the expression type in each expression period.

The editing area A3 is an image representative of temporal variation of characteristics at a vocoder level (that is, characteristics on a vocoder), for example, an image representative of temporal variation in frequency characteristics of the voice to be synthesized. Specifically, a curve representative of temporal variation of a fundamental frequency F0 of the voice to be synthesized is displayed in the editing area A3. The user can provide an editing instruction Q3 for the editing area A3 by operating the input device 13. The editing instruction Q3 is, for example, an instruction to change the temporal variation in the fundamental frequency F0.

The editing processor E0 in FIG. 2 changes the control data C0 at the musical level in accordance with the editing instruction Q0 provided by the user for the editing area A0. Specifically, the editing processor E0 changes conditions (the sound period, the pitch, or the phonetic identifier) of each note designated by the control data C0, or the musical symbols designated by the control data C0 in accordance with the editing instruction Q0. If the editing instruction Q0 is provided, the control data C0 changed by the editing processor E0 is supplied to the trained model M1, the trained model M2, and the trained model M3. On the other hand, if the editing instruction Q0 is not provided, the control data C0 as is stored in the storage device 12 is supplied to the trained model M1, the trained model M2, and the trained model M3.

The trained model M1 outputs control data C1 at the phonetic level according to the control data C0 supplied thereto at the musical level. The control data C1 is data representing phonemes of a voice to be synthesized. Specifically, the control data C1 is indicative of a series of phonemes corresponding to the phonetic identifiers designated by the control data C0. For example, the control data C1 designates phonemic symbols (representative of phonemes) and sound periods of phonemes of the voice to be synthesized. A sound period of a phoneme is specified by, for example, the start point and the end point, or the start point and the duration of the period.

The trained model M1 in the first embodiment has been trained through machine learning (particularly, deep learning) using teacher data, so as to be a statistical predictive model having learned relations between control data C0 and control data C1. NPL Documents 1-3 mentioned earlier, for example, disclose how to use trained models. In the teacher data, control data C0 and control data C1 are associated with each other. For example, a neural network that outputs control data C1 according to control data C0 is preferably used as the trained model M1. Coefficients K1 that define the trained model M1 are set through the machine learning and are stored in the storage device 12. As a result, the trained model M1 outputs control data C1 that is statistically adequate for unknown control data C0 under a tendency extracted from the teacher data (relations between control data C0 and control data C1). The display controller 21 causes the display 14 to display the editing area A1 in accordance with the control data C1 generated by the trained model M1. That is, the phonemic symbol and the sound period designated by the control data C1 for each of the phonemes are displayed in the editing area A1.

The editing processor E1 changes at the phonetic level the control data C1 output from the trained model M1 in accordance with the editing instruction Q1 provided by the user for the editing area A1. Specifically, the editing processor E1 changes the phonemic symbol or the sound period designated by the control data C1 for a phoneme in accordance with the editing instruction Q1. The display controller 21 updates the displayed content in the editing area A1 corresponding to the changed control data C1. If the editing instruction Q1 is provided, the control data C1 changed by the editing processor E1 is supplied to the trained model M2 and to the trained model M3. If the editing instruction Q1 is not provided, the control data C1 as is output from the trained model M1 is supplied to the trained model M2 and to the trained model M3.

The trained model M2 outputs control data C2 at the voicing level according to input data D2 supplied thereto. The input data D2 includes the control data C0 at the musical level and the control data C1 at the phonetic level. The control data C2 relates to musical expression of the voice to be synthesized. Specifically, the control data C2 designates one or more expression periods on the time axis and an expression type in each of the expression periods, which are specified by, for example, the start point and the end point, or the start point and the duration of the period.

The trained model M2 in the first embodiment has been trained through machine learning (particularly, deep learning) using teacher data, so as to be a statistical predictive model having learned relations between input data D2 and control data C2. In the teacher data, input data D2 and control data C2 are associated with each other. For example, a neural network that outputs control data C2 according to input data D2 is preferably used as the trained model M2. Coefficients K2 that define the trained model M2 are set through the machine learning and are stored in the storage device 12. Thus, the trained model M2 outputs control data C2 that is statistically adequate for unknown input data D2 under a tendency extracted from the teacher data (relations between input data D2 and control data C2). The display controller 21 causes the display 14 to display the editing area A2 in accordance with the control data C2 generated by the trained model M2. Specifically, the one or more expression periods and the one or more expression types designated by the control data C2 are displayed in the editing area A2.

The editing processor E2 changes the control data C2 at the voicing level output from the trained model M2 in accordance with the editing instruction Q2 provided by the user for the editing area A2. Specifically, the editing processor E2 changes an expression period or an expression type designated by the control data C2 in accordance with the editing instruction Q2. The display controller 21 updates the displayed content in the editing area A2 corresponding to the changed control data C2. If the editing instruction Q2 is provided, the control data C2 changed by the editing processor E2 is supplied to the trained model M3. If the editing instruction Q2 is not provided, the control data C2 as is output from the trained model M2 is supplied to the trained model M3.

The trained model M3 outputs control data C3 (an example of synthesis data) at the vocoder level according to input data D3 (an example final input data) supplied thereto. The input data D3 includes the control data C0 at the musical level, the control data C1 at the phonetic level, and the control data C2 at the voicing level. The control data C3 is data representing frequency characteristics of the voice to be synthesized. For example, the control data C3 designates a series of the fundamental frequencies F0 of the voice to be synthesized, a series of envelopes of harmonic components, and a series envelopes of non-harmonic components. An envelope of harmonic components is a curve representative of a contour of an intensity spectrum (the amplitude spectra or the power spectra) of the harmonic components. The harmonic components are frequency components consisting of a fundamental tone component of the fundamental frequency F0 and overtone components having frequencies that are integer multiples of the fundamental frequency F0. An envelope of non-harmonic components is a curve representative of a contour of an intensity spectrum of the non-harmonic components. The non-harmonic components are non-periodic components (residual components) other than the harmonic components. The envelopes of the harmonic components and the non-harmonic components are expressed by, for example, Mel-frequency cepstral coefficients.

The trained model M3 in the first embodiment has been trained through machine learning (particularly, deep learning) using teacher data, so as to be a statistical predictive model having learned relations between input data D3 and control data C3. In the teacher data, input data D3 and control data C3 are associated with each other. For example, a neural network that outputs control data C3 according to input data D3 is preferably used as the trained model M3. Coefficients K3 that define the trained model M3 are set through the machine learning and are stored in the storage device 12. Thus, the trained model M3 outputs control data C3 that is statistically adequate for unknown input data D3 under a tendency extracted from the teacher data (relations between input data D3 and control data C3). The display controller 21 causes the display 14 to display the editing area A3 in accordance with the control data C3 generated by the trained model M3. Specifically, a series of the fundamental frequencies F0 designated by the control data C3 is displayed in the editing area A3.

The editing processor E3 changes the control data C3 at the vocoder level output from the trained model M3 in accordance with the editing instruction Q3 provided by the user for the editing area A3. Specifically, the editing processor E3 changes the fundamental frequency F0 designated by the control data C3 in accordance with the editing instruction Q3. The display controller 21 updates the displayed content in the editing area A3 corresponding to the changed control data C3. If the editing instruction Q3 is provided, the control data C3 changed by the editing processor E3 is supplied to the synthesis processor 22. If the editing instruction Q3 is not provided, the control data C3 as is output from the trained model M3 is supplied to the synthesis processor 22.

The synthesis processor 22 generates a voice signal V based on the control data C3 supplied thereto. Any known voice synthesis technique can be employed to generate the voice signal V by the synthesis processor 22. An SMS (Spectral Model Synthesis) is preferably used for generation of the voice signal V. The voice signal V generated by the synthesis processor 22 is supplied to the sound device 15 and is reproduced in the form of sound waves. As will be apparent from the above explanation, the synthesis processor 22 corresponds to a so-called vocoder.

After the editing processor E0 changes the control data C0 at the musical level in accordance with the editing instruction Q0, the user uses the input device 13 to operate the button B0 shown in FIG. 3. If the button B0 is operated, generation of the control data C1 by the trained model M1, generation of the control data C2 by the trained model M2, and generation of the control data C3 by the trained model M3 are performed based on the changed control data C0.

After the editing processor E1 changes the control data C1 at the phonetic level in accordance with the editing instruction Q1, the user uses the input device 13 to operate the button B1. If the button B1 is operated, the changed control data C1 is supplied to the trained model M2 and to the trained model M3, and generation of the control data C2 by the trained model M2 and generation of the control data C3 by the trained model M3 are performed. Even if the button B1 is operated, the trained model M1 does not generate the control data C1. Instead, the control data C1 is changed according to the editing instruction Q1 is used to generate the voice signal V.

After the editing processor E2 changes the control data C2 at the voicing level in accordance with the editing instruction Q2, the user uses the input device 13 to operate the button B2. If the button B2 is operated, the changed control data C2 is supplied to the trained model M3, and the control data C3 is generated by the trained model M3. Even if the button B2 is operated, the trained model M1 does not generate the control data C1, or the trained model M2 does not generate the control data C2. Instead, the control data C2 according to the editing instruction Q2 is used to generate the voice signal V.

Figure 4:
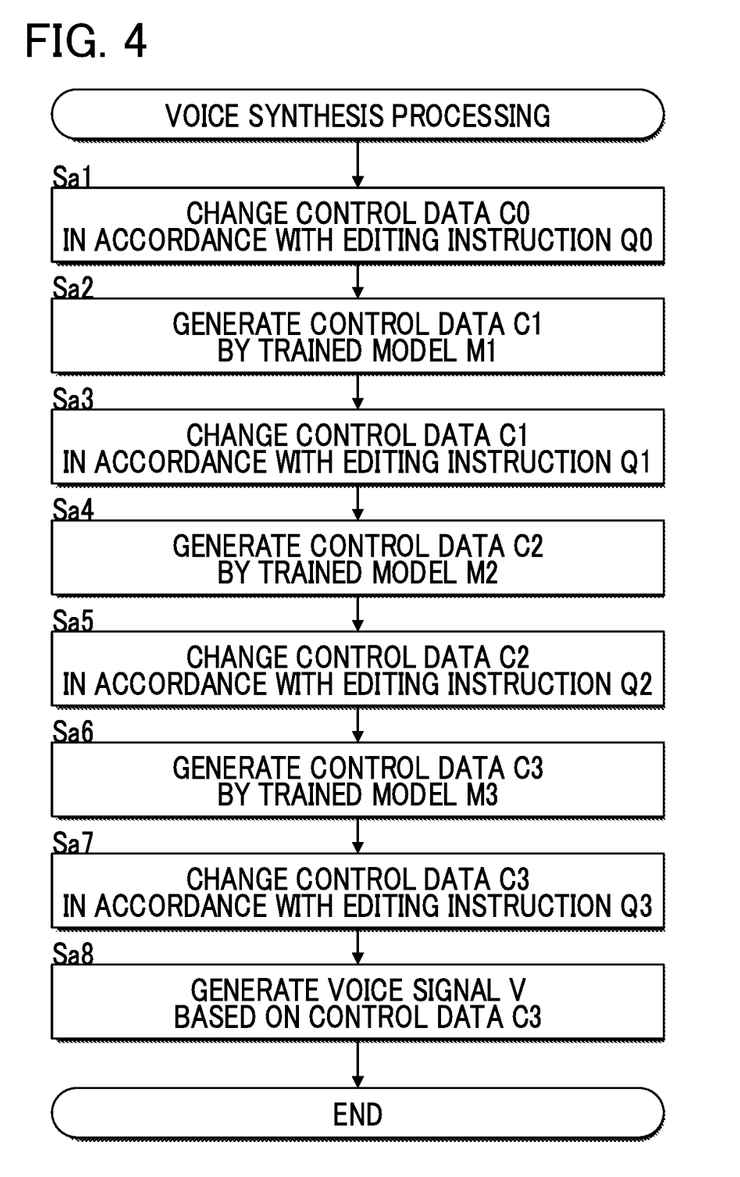
FIG. 4 is a flowchart of voice synthesis processing.

FIG. 4 is a flowchart of processing (hereafter, "voice synthesis processing") in which the controller 11 generates the voice signal V. The voice synthesis processing is performed, for example, in response to an instruction given by the user to the voice synthesis apparatus 100. The voice synthesis processing is performed, for example, when the button B3 ("play") in FIG. 3 is operated.

After the voice synthesis processing is started, the editing processor E0 changes control data C0 at the musical level in accordance with an editing instruction Q0 provided by the user (Sa1). If the editing instruction Q0 is not provided, the change of the control data C0 is not executed.

According to the control data C0, the trained model M1 generates control data C1 designating the phonemes of the voice to be synthesized (Sa2). The editing processor E1 changes the control data C1 at the phonetic level in accordance with an editing instruction Q1 provided by the user (Sa3). If the editing instruction Q1 is not provided, the change of the control data C1 is not executed.

According to input data D2 including the control data C0 and the control data C1, the trained model M2 generates control data C2 designating the musical expression of the voice to be synthesized (Sa4). The editing processor E2 changes the control data C2 at the voicing level in accordance with an editing instruction Q2 provided by the user (Sa5). If the editing instruction Q2 is not provided, the change of the control data C2 is not executed.

According to input data D3 including the control data C0, the control data C1, and the control data C2, the trained model M3 generates control data C3 designating the frequency characteristics of the voice to be synthesized (Sa6). The editing processor E3 changes the control data C3 at the vocoder level in accordance with the editing instruction Q3 made by the user (Sa7). If the editing instruction Q3 is not provided, the change of the control data C3 is not executed. The synthesis processor 22 generates the voice signal V based on the control data C3 (Sa8).

As described above, in the first embodiment, an instruction (the editing instruction Q1 or Q2) operates in a middle stage among processes of generating the control data C3 based on the control data C0. In this way, an advantage is obtained in that a voice signal V of a synthesis voice that better suits a user's intension or taste can be generated, as compared with a configuration in which a user can edit only the control data C0.

Particularly, in the first embodiment, the control data C1 representing phonemes of a voice to be synthesized is changed in accordance with the editing instruction Q1 provided by the user. Thus, it is possible to generate a voice signal V of the synthesis voice in which the phonemes are adjusted to suit the intension or taste of the user. Further, the control data C2 representing expressions of the voice to be synthesized is changed in accordance with the editing instruction Q2 provided by the user. Thus, it is possible to generate a voice signal of the synthesis voice, in which the musical expressions are adjusted to suit the intension or taste of the user. The control data C3 is changed in accordance with the editing instruction Q3 provided by the user. Thus, it is possible to generate a voice signal V of the synthesis voice, in which the frequency characteristics are adjusted to suit the intension or taste of the user.

Second Embodiment

A second embodiment of the present disclosure will now be explained. It is of note that in each mode illustrated below, for elements having effects or functions identical to those of the first embodiment, reference signs used in the descriptions of the first embodiment are used and detailed explanations of such elements are omitted as appropriate.

Figure 5:
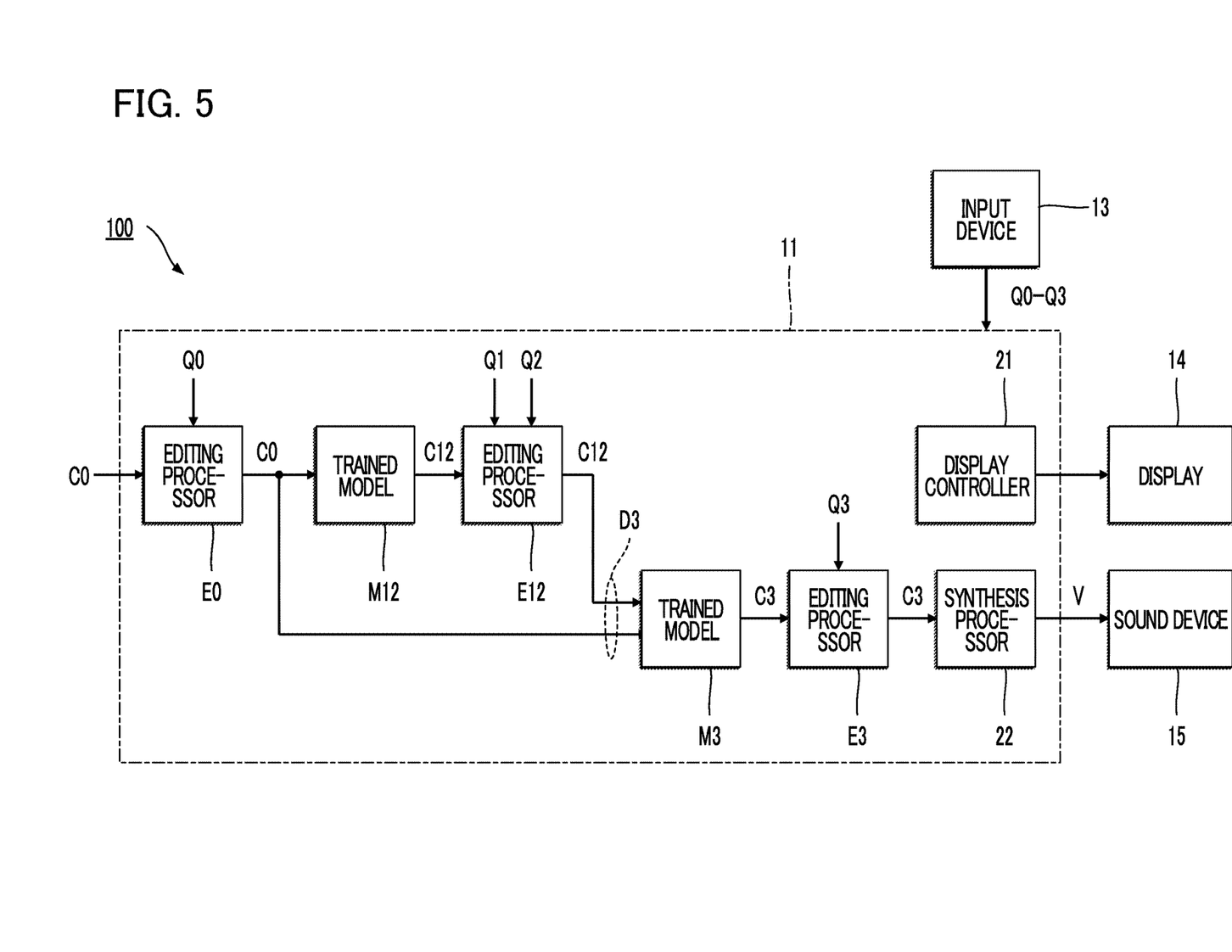
FIG. 5 is a block diagram illustrating a functional configuration of a voice synthesis apparatus according to a second embodiment.

FIG. 5 is a block diagram illustrating a functional configuration of the controller 11 in the second embodiment. As illustrated in FIG. 5, in the second embodiment the trained model M1, the editing processor E1, the trained model M2, and the editing processor E2 in the first embodiment are replaced by a trained model M12 (an example of an intermediate trained model) and an editing processor E12. The control data C0 editable by the editing processor E0 is supplied to the trained model M12.

The trained model M12 outputs control data C12 at a phonetic-voicing level according to the control data C0 at the musical level supplied thereto. The control data C12 is data representing phonemes and musical expressions of a voice to be synthesized. Specifically, the control data C12 designates a phonemic symbol and a sound period of each of phonemes corresponding to a phonetic identifier designated by the control data C0. Also designated in the control data C12 are an expression period in which an expression is added to the voice to be synthesized, and an expression type. That is, the control data C12 in the second embodiment consists of a combination of the control data C1 and the control data C2 of the first embodiment.

The trained model M12 in the second embodiment has been trained through machine learning (particularly, deep learning) using teacher data, so as to be a statistical predictive model having learned relations between control data C0 and control data C12. In the teacher data, control data C0 and control data C12 are associated with each other. For example, a neural network that outputs control data C12 according to control data C0 is preferably used as the trained model M12. Coefficients that define the trained model M12 are set through the machine learning and are stored in the storage device 12. Thus, the trained model M12 outputs control data C12 that is statistically adequate for unknown control data C0 under a tendency extracted from the teacher data (relations between control data C0 and control data C12). The display controller 21 causes the display 14 to display the editing area A1 and the editing area A2 based on the control data C12 generated by the trained model M12.

The editing processor E12 changes the control data C12 at the phonetic-voicing level output from the trained model M12 in accordance with the editing instruction Q1 for the editing area A1 provided by the user or the editing instruction Q2 for the editing area A2 provided by the user. Specifically, the editing processor E12 changes a phonemic symbol and a sound period designated by the control data C12 for each phoneme in accordance with the editing instruction Q1, and changes an expression period and an expression type designated by the control data C12 in accordance with the editing instruction Q2. The display controller 21 updates the displayed content in the editing area A1 and the editing area A2 corresponding to the changed control data C12. If the editing instruction Q1 or the editing instruction Q2 is provided, the control data C12 changed by the editing processor E12 is supplied to the trained model M3. If neither the editing instruction Q1 nor the editing instruction Q2 is provided, the control data C12 as is output from the trained model M12 is supplied to the trained model M3.

The trained model M3 in the second embodiment outputs the control data C3 (an example of synthesis data) at the vocoder level according to input data D3 supplied thereto. The input data D3 includes the control data C0 at the musical level and the control data C12 at the phonetic-voicing level. A specific operation of the trained model M3 to output the control data C3 according to the input data D3 is substantially the same as that in the first embodiment. In substantially the same manner as in the first embodiment, the editing processor E3 changes the control data C3 in accordance with the editing instruction Q3 provided by the user, and then the synthesis processor 22 generates the voice signal V based on the control data C3.

Figure 6:
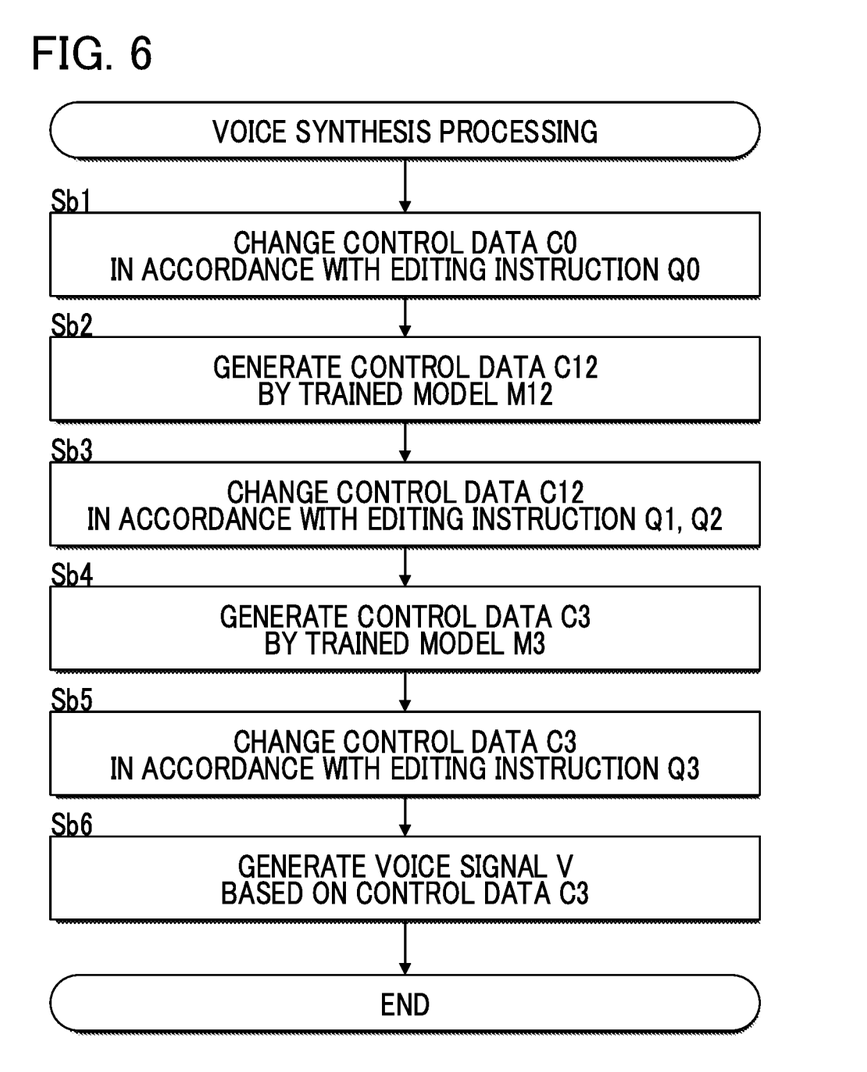
FIG. 6 is a flowchart of voice synthesis processing in the second embodiment.

FIG. 6 is a flowchart of voice synthesis processing in the second embodiment. For example, voice synthesis processing is performed in response to an instruction provided by a user to the voice synthesis apparatus 100. The voice synthesis processing is performed, for example, when the button B3 (play) in FIG. 3 is operated.

After the voice synthesis processing is started, the editing processor E0 changes control data C0 at the musical level in accordance with an editing instruction Q0 provided by the user (Sb1). If the editing instruction Q0 is not provided, the change of the control data C0 is not executed.

The trained model M12 generates control data C12 representing phonemes of a voice to be synthesized in accordance with the control data C0 (Sb2). The editing processor E12 changes the control data C12 at the phonetic-voicing level in accordance with the editing instruction Q1 or the editing instruction Q2 provided by the user (Sb3). If neither the editing instruction Q1 nor the editing instruction Q2 is provided, the change of the control data C12 is not executed.

The trained model M3 generates control data C3 representing frequency characteristics of the voice to be synthesized according to input data D3 supplied thereto (Sb4). The input data D3 includes the control data C0 and the control data C12. The editing processor E3 changes the control data C3 at the vocoder level in accordance with an editing instruction Q3 provided by the user (Sb5). If the editing instruction Q3 is not provided, the change of the control data C3 is not executed. The synthesis processor 22 generates the voice signal V based on the control data C3 (Sb6).

In the second embodiment, an instruction (the editing instruction Q1 or Q2) operates in a middle stage among processes of generating the control data C3 based on the control data C0. Therefore, similarly to the first embodiment, it is possible to generate the voice signal V of a voice to better suit the intension or taste of a user, as compared with a configuration in which a user can edit only the control data C0. Particularly, in the second embodiment, the control data C12 representing phonemes and expressions of the voice to be synthesized is changed in accordance with the editing instruction Q1 or the editing instruction Q2 provided by the user. Thus, an additional advantage is obtained in that the voice signal V of the voice to be synthesized can be generated in which the phonemes or the expressions have been adjusted to suit the intension or taste of the user.

Modifications

Specific modifications added to each of the embodiments illustrated above are illustrated below.

(1) For example, the voice synthesis apparatus 100 may be realized by a server device that communicates with a terminal device (for example, a mobile phone or a smartphone) via a communication network, such as a mobile communication network or the Internet. Specifically, the voice synthesis apparatus 100 generates a voice signal V by executing the voice synthesis processing (FIG. 4 or FIG. 6) based on control data C0 received from the terminal device, and transmits the voice signal V to the terminal device. The sound device 15 of the terminal device reproduces a voice that is represented by the voice signal V received from the voice synthesis apparatus 100. The control data C3 generated by the editing processor E3 of the voice synthesis apparatus 100 may be transmitted to the terminal device, and the synthesis processor 22 installed in the terminal device may generate the voice signal V based on the control data C3. That is, the synthesis processor 22 may be omitted from the voice synthesis apparatus 100. Alternatively, the editing processor E0 mounted on the terminal device may generate control data C0, the generated control data C0 may be transmitted to the voice synthesis apparatus 100, and the voice synthesis apparatus 100 may generate a voice signal V based on the control data C0 and transmit the generated voice signal V to the terminal device. That is, the editing processor E0 may be omitted from the voice synthesis apparatus 100. In the configuration in which the voice synthesis apparatus 100 is realized by the server device, the display controller 21 causes the display 14 of the terminal device to display the editing screen in FIG. 3.

(2) The voice synthesis apparatus 100 according to each of the embodiments described above is realized by coordination between a computer (specifically, the controller 11) and a computer program as illustrated in the embodiments. The computer program according to each of the embodiments described above is provided in a form readable by a computer and stored in a recording medium, and is installed in the computer. The recording medium is, for example, a non-transitory recording medium. While an optical recording medium (an optical disk) such as a CD-ROM (Compact disk read-only memory) is a preferred example thereof, the recording medium also includes a recording medium of any known form, such as a semiconductor recording medium or a magnetic recording medium. The non-transitory recording medium includes any recording medium except for a transitory, propagating signal and does not exclude a volatile recording medium. The computer program may be provided to a computer in a form of distribution via a communication network. The subject that executes the computer program is not limited to the CPU. However, a processor for a neural network, such as a Tensor Processing Unit (TPU) and a neural engine, or a DSP (Digital Signal Processor) for signal processing may execute the program. Plural types of subjects selected from the above examples may coordinate with each other to execute the computer program.

(3) A trained model is realized by a combination of a computer program (for example, a program module constituting artificial-intelligence software) that causes the controller 11 to perform an operation for identifying output B from input A, and coefficients applied to the operation. The coefficients of the trained model are optimized by performing machine learning (particularly, deep learning) in advance using teacher data, in which an input A and an output B are associated with each other. That is, a trained model is a statistical model having learned relations between input A and output B. The controller 11 performs, on an unknown input A, an operation to which the trained coefficients and a predetermined response function are applied, thereby generating output B that is statistically adequate for the input A under a tendency (relations between input A and output B) extracted from the teacher data.

(4) The following configurations, for example, are derivable from the embodiments illustrated above.

A voice synthesis method according to a preferred aspect (a first aspect) of the present disclosure includes: generating second control data using an intermediate trained model with first input data including first control data designating phonetic identifiers; changing the second control data in accordance with a first user instruction provided by a user; generating synthesis data representing frequency characteristics of a voice to be synthesized using a final trained model with final input data including the first control data and the changed second control data; and generating a voice signal based on the generated synthesis data. In this aspect, the first user instruction provided by the user operates in a middle stage among processes of generating the synthesis data from the first control data. As a result, it is possible to generate a voice signal representative of a voice to be synthesized that more suits an intension or taste of the user, as compared with a configuration in which a user can edit only the first control data.

For example, the trained model M1 or the trained model M2 in the first embodiment, and the trained model M12 in the second embodiment are preferred examples of the "intermediate trained model" in the first aspect. In a case in which the trained model M1 in the first embodiment is construed as the "intermediate trained model", the control data C1 corresponds to the "second control data" and the editing instruction Q1 corresponds to the "first user instruction". In a case in which the trained model M2 in the first embodiment is construed as the "intermediate trained model", the control data C2 corresponds to the "second control data" and the editing instruction Q2 corresponds to the "first user instruction". In a case in which the trained model M12 in the second embodiment is construed as the "intermediate trained model", the control data C12 corresponds to the "second control data" and the editing instruction Q1 or the editing instruction Q2 corresponds to the "first user instruction". The trained model M3 in the first embodiment or the second embodiment is an example of the "final trained model".

In a preferred example (a second aspect) of the first aspect, the intermediate trained model is a first trained model configured to generate the second control data according to the first input data, and the second control data represents phonemes of the voice to be synthesized. In this aspect, the second control data representing phonemes of the voice to be synthesized is changed in accordance with a first user instruction provided by the user. As a result, it is possible to generate a voice signal of the voice to be synthesized in which the phonemes are adjusted to suit an intension or taste of the user. A preferred example of the "first trained model" in the second aspect is, for example, the trained model M1 in the first embodiment.

In a preferred example (a third aspect) of the second aspect, the method further includes generating third control data representing expressions of the voice to be synthesized using a second trained model with second input data including the first control data and the changed second control data; and changing the third control data in accordance with a second user instruction provided by the user, and the final input data further includes the changed third control data. In this aspect, the third control data representing expressions of the voice to be synthesized is changed in accordance with a second user instruction provided by the user. As a result, it is possible to generate a voice signal of the voice to be synthesized in which the expressions are adjusted to suit an intension or taste of the user. A preferred example of the "second trained model" in the third aspect is, for example, the trained model M2 in the first embodiment, and a preferred example of the "third control data" in the third aspect is, for example, the control data C2 in the first embodiment.

In a preferred example (a fourth aspect) of the first aspect, the second control data represents phonemes and expressions of the voice to be synthesized. In this aspect, the second control data representing phonemes and expressions of the voice to be synthesized is changed in accordance with a first user instruction provided by the user. As a result, it is possible to generate a voice signal of the voice to be synthesized in which the phonemes and the expressions are adjusted to suit an intension or taste of the user. A preferred example of the "intermediate trained model" in the fourth aspect is, for example, the trained model M12 in the second embodiment, and a preferred example of the "first user instruction" in the fourth aspect is, for example, the editing instruction Q1 or the editing instruction Q2 in the second embodiment.

In a preferred example (a fifth aspect) of any of the first to fourth aspects, the method further includes changing the synthesis data in accordance with a third user instruction provided by the user, and the generating of the voice signal includes generating the voice signal according to the changed synthesis data. In this aspect, the synthesis data is changed in accordance with a third user instruction provided by the user. As a result, it is possible to generate a voice signal of the voice to be synthesized in which frequency characteristics are adjusted to suit an intension or taste of the user. A preferred example of the "third user instruction" in the fifth aspect is, for example, the editing instruction Q3 in the first embodiment or the second embodiment.

A voice synthesis apparatus according to a preferred aspect (a sixth aspect) of the present disclosure includes: a memory storing machine instructions; at least one processor that implements the machine instructions to execute a plurality of tasks, including: a first generating task that generates second control data using an intermediate trained model with first input data including first control data designating phonetic identifiers; a first changing task that changes the second control data in accordance with a first user instruction provided by a user; a second generating task that generates synthesis data representing frequency characteristics of a voice to be synthesized using a final trained model with final input data including the first control data and the changed second control data; and a third generating task that generates a voice signal based on the generated synthesis data. In this aspect, the first user instruction provided by the user operates in a middle stage among processes of generating the synthesis data from the first control data. Therefore, it is possible to generate a voice signal representing a voice to be synthesized that better suits an intension or taste of the user, as compared with a configuration in which the user can edit only the first control data.

A non-transitory computer-readable recording medium according to a preferred aspect (a seventh aspect) of the present disclosure stores a program executable by a computer to perform a voice synthesis method comprising: generating second control data using an intermediate trained model with first input data including first control data designating phonetic identifiers; changing the second control data in accordance with a first user instruction provided by a user; generating synthesis data representing frequency characteristics of a voice to be synthesized using a final trained model with final input data including the first control data and the changed second control data; and generating a voice signal based on the generated synthesis data. In this aspect, the first user instruction operates in a middle stage among processes of generating the synthesis data from the first control data. As a result, it is possible to generate a voice signal representing a voice to be synthesized that better suits an intension or taste of the user, as compared with a configuration in which the user can edit only the first control data.

Description of Reference Signs

100 . . . voice synthesis apparatus, 11 . . . controller, 12 . . . storage device, 13 . . . input device, 14 . . . display, 15 . . . sound device, 21 . . . display controller, 22 . . . synthesis processor, E0,E1,E2,E3,E12 . . . editing processor, M1,M2,M3,M12 . . . trained model, Q0,Q1,Q2,Q3 . . . editing instruction, A0,A1,A2,A3 . . . editing area, B0,B1,B2,B3 . . . button.

What is claimed is:

1. A computer-implemented voice synthesis method that uses a plurality of trained models trained at different levels, including a first trained model trained at a phonetic level or a phonetic-voicing level and a second trained model trained at a vocoder level, the voice synthesis method comprising:

generating, by supplying first input data, which includes first control data at a musical level representing a musical characteristic of a song including phonetic identifiers, to the first trained model, second control data at the phonetic level representing phonemes of a voice to be synthesized or at the phonetic-voicing level representing phonemes and expressions of the voice to be synthesized;

changing the generated second control data in accordance with a first user instruction provided by a user;

generating, by supplying second input data, which includes the first control data and the changed second control data, to the second trained model, synthesis data at the vocoder level representing frequency characteristics of the voice to be synthesized; and generating a musical voice signal based on the generated synthesis data.

2. The voice synthesis method according to claim 1, wherein:

the first trained model is trained at the phonetic or phonetic-voicing level using first teacher data to learn relationships in the first teacher data between the first control data and the second control data at the phonetic or phonetic-voicing level, and the second trained model is trained at the vocoder level using second teacher data to learn relationships in the second teacher data between the first control data, the second control data, and the synthesis data at the vocoder level.

3. The voice synthesis method according to claim 2, wherein:

the first trained model is trained at the phonetic level using the first teacher data so that the generated second control data is at the phonetic level representing phonemes of the voice to be synthesized, the plurality of trained models include a third trained model trained at a voicing level, and the method further comprises:

generating, by supplying third input data, including the first control data and the changed second control data, to the third trained model, third control data at the voicing level representing the expressions of the voice to be synthesized; and changing the generated third control data at the voicing level in accordance with a second user instruction provided by the user, wherein the second input data further includes the changed third control data.

4. The voice synthesis method according to claim 3, wherein:

the third trained model is trained at the voicing level using third teacher data to learn relationships in the third teacher data between the first control data, the second control data, and the third control data at the voicing level presenting the expressions of the voice to be synthesized, and the second teacher data teaches relationship between the first control data, the second control data, the third control data, and the synthesis data so that the second trained model learns the relationship in the second teacher data.

5. The voice synthesis method according to claim 1, further comprising:

changing the generated synthesis data at the vocoder level in accordance with a third user instruction provided by the user, wherein the generating of the voice signal includes generating the voice signal according to the changed synthesis data.

6. A voice synthesis apparatus that uses a plurality of trained models trained at different levels, including a first trained model trained at a phonetic level or a phonetic-voicing level and a second trained model trained at a vocoder level, the voice synthesis apparatus comprising:

a memory storing machine instructions;

at least one processor that implements the machine instructions to execute a plurality of tasks, including:

a first generating task that generates, by supplying first input data, which includes first control data at a musical level representing a musical characteristic of a song, including phonetic identifiers, to the first trained model, second control data at the phonetic level representing phones of a voice to be synthesized or at the phonetic- voicing level representing phonemes and expression of the voice to be synthesized a changing task that changes the generated second control data in accordance with a first user instruction provided by a user;

a second generating task that generates, by supplying second input data, which includes the first control data and the changed second control data, to the second trained model, synthesis data at the vocoder level representing frequency characteristics of the voice to be synthesized; and a third generating task that generates a musical voice signal based on the generated synthesis data.

7. A non-transitory computer-readable recording medium storing a program executable by a computer to perform a voice synthesis method that uses a plurality of trained models trained at different levels, including a first trained model trained at a phonetic level or a phonetic-voicing level and a second trained model trained at a vocoder level, the voice synthesis method comprising:

generating, by supplying first input data, which includes first control data at a musical level representing a musical characteristic of a song including phonetic identifiers, to the first trained model, second control data at the phonetic level representing phonemes of a voice to be synthesized or at the phonetic-voicing level representing phonemes and expressions of the voice to be synthesized;

changing the generated second control data in accordance with a first user instruction provided by a user;

generating, by supplying second input data, which includes the first control data and the changed second control data, to the second trained model, synthesis data at the vocoder level representing frequency characteristics of the voice to be synthesized; and generating a musical voice signal based on the generated synthesis data.

8. The voice synthesis method according to claim 2, wherein the first trained model is trained at the phonetic-voicing level using the first teacher data so that the generated second control data is at the phonetic-voicing level.

* * * * *